J. CRANSHAW.
FREIGHT CAR.
APPLICATION FILED JUNE 8, 1912.

1,207,869.

Patented Dec. 12, 1916.
3 SHEETS—SHEET 1.

Witnesses

Inventor
J. Cranshaw
By
Attorney

J. CRANSHAW.
FREIGHT CAR.
APPLICATION FILED JUNE 8, 1912.

1,207,869.

Patented Dec. 12, 1916.
3 SHEETS—SHEET 2.

J. CRANSHAW.
FREIGHT CAR.
APPLICATION FILED JUNE 8, 1912.

1,207,869.

Patented Dec. 12, 1916.
3 SHEETS—SHEET 3.

Witnesses

Inventor
J. Cranshaw
By
Attorney

UNITED STATES PATENT OFFICE.

JOHN CRANSHAW, OF DENVER, COLORADO.

FREIGHT-CAR.

1,207,869.	Specification of Letters Patent.	Patented Dec. 12, 1916.

Application filed June 8, 1912. Serial No. 702,396.

*To all whom it may concern:*

Be it known that I, JOHN CRANSHAW, a citizen of the United States, residing at Denver, in the county of Denver, State of Colorado, have invented certain new and useful Improvements in Freight-Cars; and I do hereby declare the following to be a full, clear, and exact description of the invention, such as will enable others skilled in the art to which it appertains to make and use the same.

This invention relates to improvements in freight cars.

The principal object of the invention is to provide a freight car which is especially adapted for use in transporting cattle, and aims to provide a platform which may be elevated and retained above the floor to form an upper deck, thereby permitting animals to be carried both on the floor and on the upper deck of the car if so desired.

A further object of the invention is to provide a novel means for locking the platform in an elevated position.

A still further object of the invention is to provide a car structure of the character described which is composed of a relatively few number of parts, is therefore simple in construction, and is cheap to manufacture.

With these and other objects in view, the invention consists in the construction and novel combination of parts hereinafter fully described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

Figure 1:
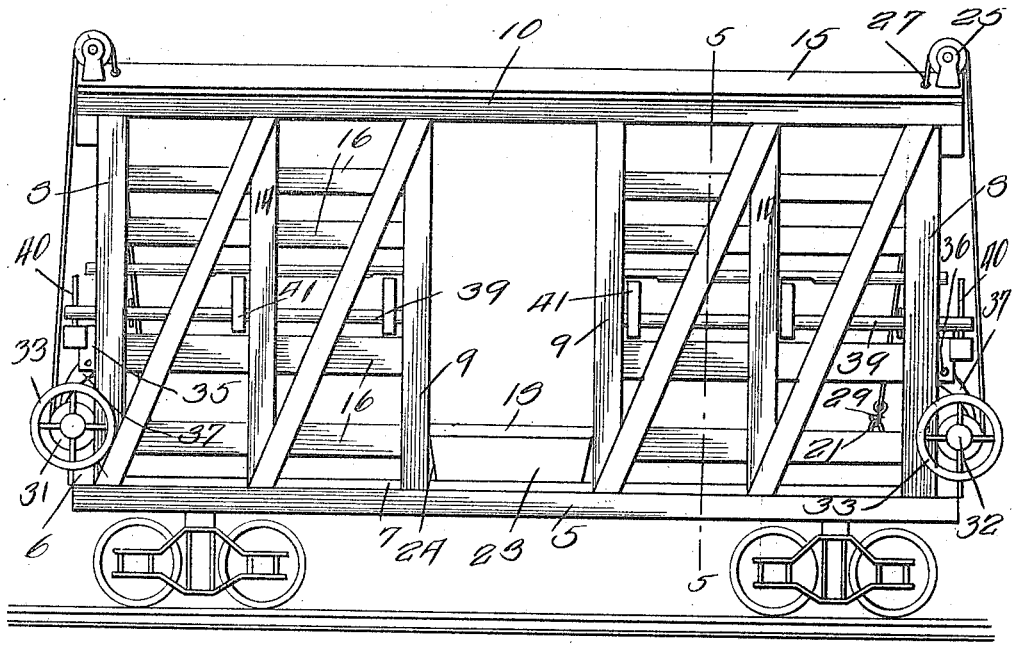
Figure 2:
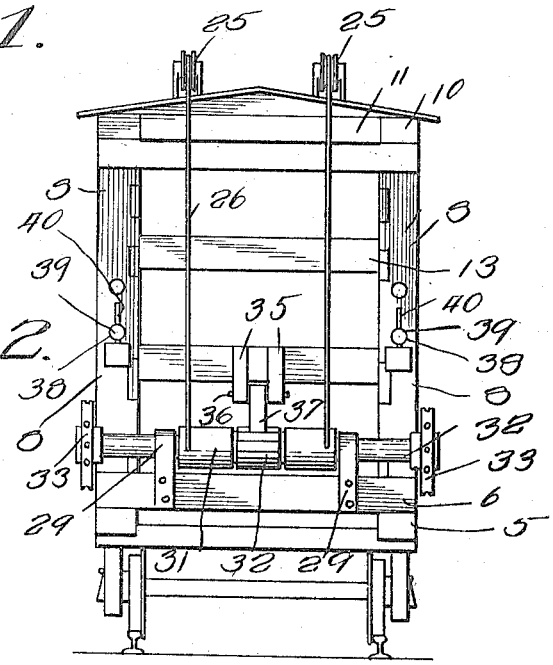
Figure 3:
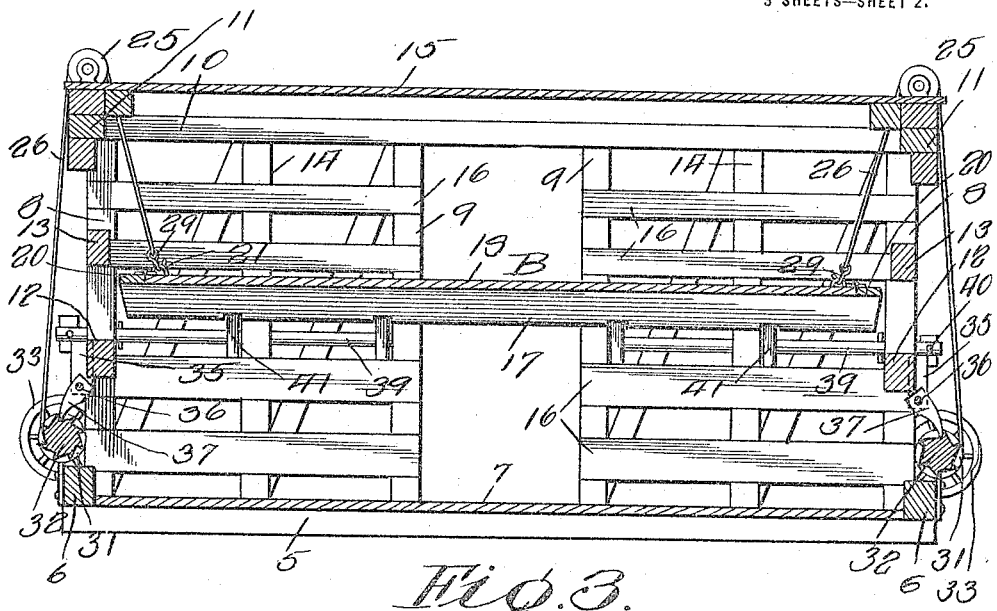
Figure 4:
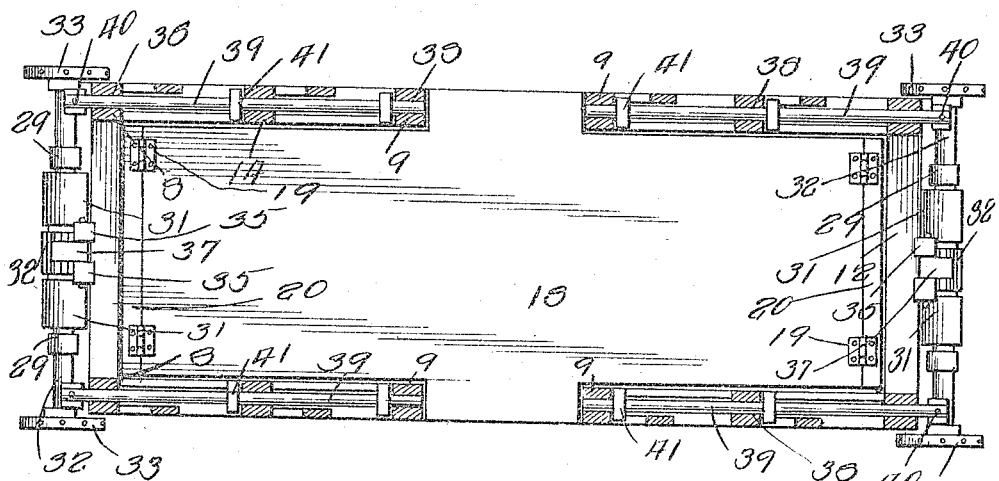
Figure 5:
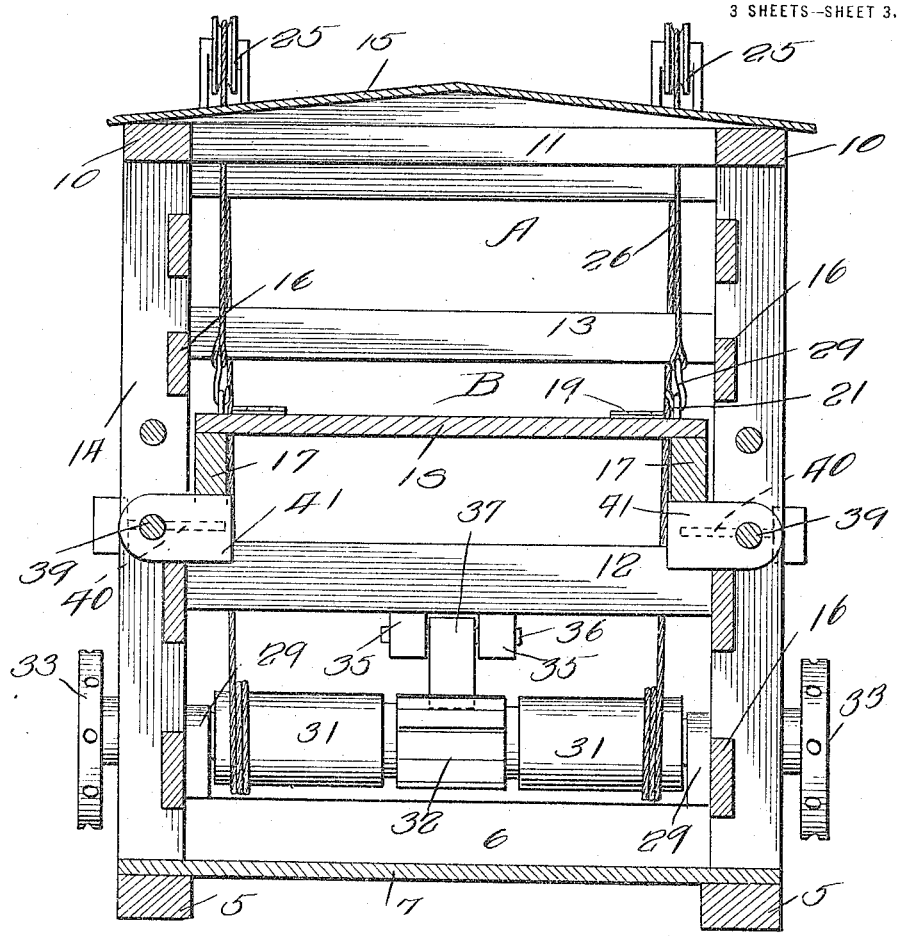
Figure 6:
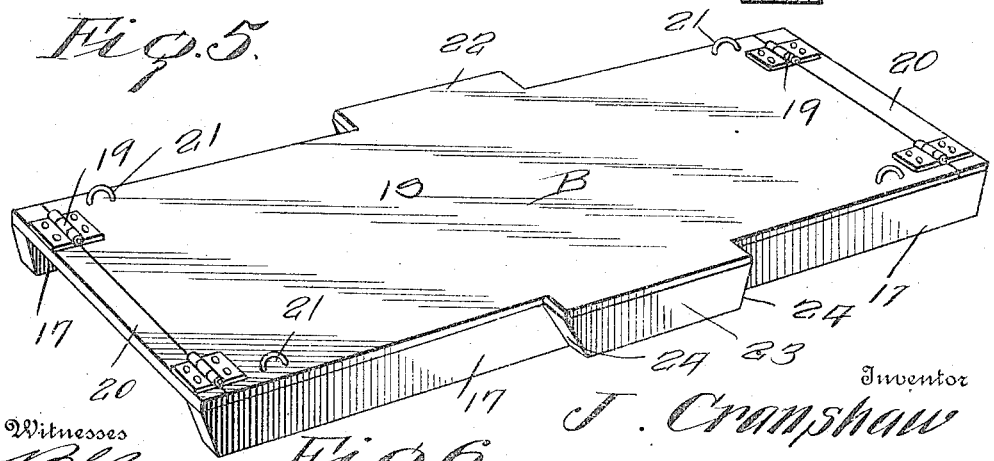

In the drawings: Figure 1 is a side elevation of a freight car constructed in accordance with my invention, Fig. 2 is an end elevation, Fig. 3 is a longitudinal sectional view through the car, Fig. 4 is a horizontal sectional view therethrough, Fig. 5 is a transverse sectional view taken on the line 5—5 of Fig. 1, the platform being shown in its elevated position, and Fig. 6 is a perspective view of the platform.

Like reference numerals designate corresponding parts in all the figures of the drawings.

Referring to the drawings, my invention includes a car body, which is designated as a whole by the reference letter A. This body consists of a pair of longitudinal sills 5—5 which are connected by end sills 6—6 and a floor 7. Extending upwardly from the sills 5 are front corner posts 8, and centrally extending from each sill 5 is a pair of spaced door posts 9—9. The posts 8 and 9 are connected by longitudinal beams 10 and each end pair of posts 8 are connected by longitudinal beams 11 and 12 and an intermediate beam 13. Connecting the beams 10 and the sills 5 are uprights 14, each upright being centrally disposed between a respective corner post 8 and door post 9. Supported by the beams 10 and 11 is a roof, which is designated as a whole by the reference numeral 15. At each end of the car and on opposite sides of the door post 9, the corner posts 8, uprights 14 and door posts 9 are connected by a series of longitudinal slats 16 which form the side walls of the car.

Disposed within the car body thus formed is a platform, which is designated as a whole by the reference letter B. This platform consists of a pair of spaced longitudinal sills 17—17, and these sills support a floor, which is designated as a whole by the reference numeral 18. The ends of the floor terminate short of the ends of the sills 17, and connected to the ends of the floor by means of hinges 19 is a transverse strip 20, which is adapted to fold over and upon the floor for a purpose as will hereinafter more fully appear. Secured to the floor at either end thereof are spaced screw-eyes 21 or other suitable attaching means.

The floor 18 is centrally formed with lateral projections 22 which fit between the respective door post 9, and thereby prevent longitudinal movement of the platform yet permitting of said platform to be elevated. In order to support these projections of the floor, blocks 23—23 are each secured centrally to the outer face of a respective sill and directly below the projection. These blocks have undercut ends 24 so as to permit of either end of the platform being tilted without interfering with the door posts 9.

In order to raise the platform, there is mounted upon each end of the roof 15 a spaced pair of pulleys 25—25, and trained over each pulley is a cable 26, one end thereof passing through a suitable opening 27 formed in the roof of the car. The free end of this cable is provided with a hook 28 or other suitable means adapted for engagement with the screw-eyes 21 of the platform. Secured to each end sill 6 of the car body A is a spaced pair of bearings 29—29, and journaled in these bearings are the ends of a drum shaft 30. Formed in this shaft is a pair of spaced drums 31—31, and intermediate said drums there is formed a ratchet 32. Associated with one end of the shaft 30 is a crank 33. The ends of the cables 26 opposite the attaching hooks 28 are fixedly secured to a respective drum 31. It will thus be observed that upon rotation of the crank 33, the shaft 31 and consequently the drums 31 will be rotated, and as a result, the adjacent end of the platform will be elevated. In order to lock each drum shaft 30 against reverse rotation, each intermediate sill 12 carries a centrally disposed pair of spaced brackets 35—35, the lower ends thereof supporting a transverse pin 36. Swingingly mounted upon this pin intermediate the bracket 35 is a gravity pawl 37 which engages the ratchet 32 of a respective drum shaft 30.

In order to positively support the platform above and in spaced relation to the floor 7, each adjacent corner post 8, upright 14 and door post 9 is centrally formed with a transverse opening 38, said openings being disposed in longitudinal alinement. These openings are disposed slightly above one of the slats 16 of the car body, and journaled in these openings is a rock shaft 39, one end thereof projecting beyond the respective end post 8 and carrying a crank 40 by means of which the shaft may be rotated. Carried by this shaft is a plurality of stop elements 41 which are normally adapted to be disposed out of the path of movement of the platform, but which upon rotation of the shaft will swing inwardly and rest upon the adjacent slats 16 and constitute supports or stops for the platform B.

In operation, when it is desired to transport a limited number of animals, the platform B is retained in its normal position upon the floor 7 of the car body. Should, however, it be desired to transport a greater number of animals, the animals are first driven upon the platform B and said platform is then elevated by the elevating means above described. In order to insure freedom of movement to the platform while being elevated, the transverse strips 20 are folded over upon the floor of the platform. After the platform has been elevated about midway of the car body, and above the stops 41, the gravity pawls 37 will by their constant engagement with the ratchets 32, support the platform until the shaft 39 has been rotated to draw the stop elements 41 below the platform. The platform is again elevated sufficiently to disengage the gravity pawls 37 from their respective ratchets 32 and the platform is then lowered and supported by the stop 41, as will be readily understood. Animals can then be driven into the car upon the floor 7 and upon the platform B, and in this manner a double-decker freight car has been readily formed.

What is claimed is:

The combination with a car body having a frame consisting of vertical standards and longitudinal slats located upon the inner sides of said standards, longitudinally extending shafts mounted through said standards so as to rotate outside of said slats, a removable floor within the car body, means for raising the floor to a point adjacent the shafts, means for rocking the shafts, blocks mounted upon said shafts in position to be turned below said floor and to rest upon the adjacent slats so as to support said floor, said floor elevating means comprising drums mounted at the lower portions of the end of the car body, pulleys located on the roof of said car, and cables extending from said floor over said pulleys to said drums, whereby said floor may be raised or lowered in accordance with the operation of said drums.

In testimony whereof, I affix my signature, in presence of two witnesses.

JOHN CRANSHAW.

Witnesses:
 LINDO O'DELL,
 G. E. PALSON.

Copies of this patent may be obtained for five cents each, by addressing the "Commissioner of Patents, Washington, D. C."